United States Patent [19]

Saito et al.

[11] Patent Number: 4,606,779
[45] Date of Patent: Aug. 19, 1986

[54] METHOD OF PRODUCING A MAGNETIC MATERIAL WIRE

[75] Inventors: Takashi Saito, Yokohama; Kazumoto Suzuki, Tokyo; Yoshihiro Naganuma, Funabashi, all of Japan

[73] Assignee: Fujikura Ltd., Tokyo, Japan

[21] Appl. No.: 703,763

[22] Filed: Apr. 12, 1985

Related U.S. Application Data

[62] Division of Ser. No. 506,013, Jun. 20, 1983, Pat. No. 4,525,432.

[30] Foreign Application Priority Data

Jun. 21, 1982 [JP] Japan .............................. 57-105499
Jun. 21, 1982 [JP] Japan .............................. 57-105500

[51] Int. Cl.$^4$ ............................................. H01F 1/04
[52] U.S. Cl. ................................... 148/120; 29/527.2
[58] Field of Search ...................... 29/527.2, 605, 607; 148/120; 72/47, 258, 700; 427/127; 336/82; 174/126 CP, 126 P, 68 R, 68 A, 70 A, 102 C; 428/607, 652, 653, 658, 659, 675–677, 678, 680, 685, 926, 928

[56] References Cited

U.S. PATENT DOCUMENTS

3,296,364 6/1965 Mason .............................. 174/126 R
3,316,345 4/1965 Toms et al. ................... 174/126 CP Primary Examiner—L. Dewayne Rutledge
Assistant Examiner—Deborah Yee
Attorney, Agent, or Firm—Kane, Dalsimer, Kane, Sullivan and Kurucz

[57] ABSTRACT

A magnetic material wire is composed of a core of magnetic material having a Curie point of 70° to 250° C. and a high conductive metal sheathing of a uniform thickness covering the core. The ratio of the metal sheathing to the wire in cross-section is in the range of 15 to 40%. There is also disclosed a method of producing such a wire.

2 Claims, 7 Drawing Figures

METHOD OF PRODUCING A MAGNETIC MATERIAL WIRE

The application is a division of Ser. No. 506,013, filed on June 20, 1983, now U.S. Pat. No. 4,525,432.

BACKGROUND OF THE INVENTION

1. Field of the Invention

This invention relates to an elongated magnetic material element adapted to be wound around a conductor of an overhead transmission line to prevent the freezing or icing thereof.

2. Prior Art

A conductor of an overhead transmission line is subjected to icing and the deposition of snow in cold districts during the winter. The snow or the ice on the conductor grows upon lapse of time to increase the weight of the conductor and a wind pressure to which the conductor is subjected, thereby excessively increasing a tension of the conductor, and a sag of the conductor between each adjacent pylons is unduly increased. As a result, the conductor tends to be broken off, and the steel pylons supporting the conductor tend to fall. Further, there is a risk that lumps of snow or ice drop from the conductor and hit a passer-by passing beneath the transmission line. Even if the transmission line is laid over agricultural lands, such fallen lumps of snow or ice may give rise to damage to the crops and farm facilities.

In order to prevent the conductor from being subjected to the deposition of snow and the icing, it has been proposed to temporarily pass a large amount of alternating current through the conductor to generate joule heat by which the snow or ice on the conductor is melted. However, this method can not be carried out at all times because of the limitations on the operation of the transmission line.

Another method of overcoming the above-mentioned difficulty is to mount rings on the conductor in spaced relation to cause the snow on the conductor to drop therefrom. However, the rings often fail to cause the snow or the ice to drop satisfactorily. Further, lumps of the snow or ice caused to drop by the rings may injure a passer-by or cause damage to the crops and the farm facilities.

It has also been proposed to mount a magnetic material element on the transmission line conductor so that the snow or the ice on the conductor is melted by the heat due to hysteresis loss and eddy current loss generated by the magnetic field developing in the magnetic material element due to the flow of alternating current through the conductor. The magnetic material element includes a wire, a tape and a rod all of which are adapted to be spirally wound around the conductor, and a sleeve adapted to be fitted on the conductor. Such magnetic material element should be as lightweight as possible to prevent the transmission line from becoming unduly heavy. Also, since the heat generated by the magnetic material element at temperatures causing no icing or snow deposition contributes to the loss of the transmission power, the magnetic material element should preferably be made of a low Curie point material of which magnetic properties are lowered at high temperatures to generate less heat. Generally, a low Curie point material tends to be less magnetic even at low temperatures than a high Curie point material. Therefore, the melting of snow or ice can not satisfactorily be achieved only by the heat due to the hysteresis loss, and the heat due to the eddy current loss must also be used together to achieve a desired melting of the snow or ice.

Usually, the magnetic material element comprises a magnetic material and a conductive metal sheathing covering it.

In the case of a magnetic material having a high Curie point of not less than 300° C., the heat due to the hysteresis loss is greater than the heat due to the eddy current loss. Therefore, the melting effect is not so affected by the thickness of the conductive metal sheathing covering the magnetic material.

In the case of a magnetic material having a low Curie point of not larger than 200° C., the heat due to the eddy current loss is greater than the heat due to the hysteresis loss. Therefore, it is necessary to properly determine the thickness of the conductive metal sheathing in order to achieve a desired melting of the snow or ice.

The magnetic material element has been made of alloys having a Curie point of 0° to 100° C., such as an alloy containing iron, nickel, chrominum and silicon and having a Curie point of around room temperature. However, magnetic properties of such alloys are liable to be affected by heat treatment conditions and other processing conditions. In addition, such alloys have a poor reproducibility. For example, the magnetic material element in the form of a wire is manufactured by drawing. Magnetic properties of the thus drawn wire are lowered due to the residual strain of the wire irrespective of the reduction rate of the drawing operation. If it is intended to use such a wire for the purpose of melting the snow or ice on the conductor, a large amount of wire must be wound around the conductor to achieve the desired melting.

SUMMARY OF THE INVENTION

It is therefore an object of this invention to provide a magnetic material element comprising a core of magnetic material having a low Curie point and a high conductive metal sheathing of a uniform thickness covering the core, the thickness of the metal sheathing being so determined as to achieve the above-mentioned melting effect.

Another object is to provide such a magnetic material element having a reduced residual strain.

According to the present invention, there is provided a magnetic material wire comprising a core of magnetic material having a Curie point of 70° to 250° C., and a high conductive metal sheathing of a uniform thickness covering the core, the ratio of the metal sheathing to the wire in cross-section being in the range of 15 to 40%.

If this ratio is less than 15%, the effect achieved by the conductive metal sheathing is not satisfactory, and particularly when this ratio is not less than 20%, a satisfactory effect is achieved. On the other hand, if this ratio exceeds 40%, the heat generated becomes unduly small. Most preferably, this ratio is 20 to 40%.

The core of magnetic material contains apart from impurities 32 to 52% by weight of nickel, 0.5 to 9% by weight of chromium, 0.2 to 2% by weight of silicon and balance iron. The core has a low Curie point of 70° to 250° C.

The high conductive metal sheathing is made of copper, aluminum, zinc and their alloys.

In the case of the cold-drawing of a metallic material, the residual strain tends to develop in the material, and the amount of the strain becomes greater toward the outer surface of the material because of the frictional contact with the tools of the processing apparatus. It has now been found that this residual strain adversely affects the magnetic properties of a magnetic material. Generally, this strain can be reduced by a heat treatment. However, in the case of a magnetic material or alloy of the kind for the above application, its magnetic properties can not sufficiently be recovered by a heat treatment. In addition, when such an alloy is heated at high temperatures, its strength is lowered, and a layer of intermetallic compound tends to be formed at the interface between the magnetic material and the conductive metal sheathing. As a result, electrical conductivity and magnetic properties are adversely affected.

According to a further aspect of the present invention, the magnetic material element in the form of a wire is bent in such a manner that the ratio of the radius (a half of the thickness) of the core to a radius of curvature of the bent wire is in the range of 2 to 9%, thereby reducing the residual strain of the wire. With this method, the residual strain can be satisfactorily reduced without the need for a heat treatment.

The magnetic material wire according to this invention may have any cross-sectional shape such as oval, square and rectangular shapes.

DESCRIPTION OF THE PREFERRED EMBODIMENTS OF THE INVENTION

The invention will now be illustrated by the following examples:

EXAMPLE 1

36% by weight of nickel, 3% by weight of chromium, 1% by weight of silicon and balance iron (apart from impurities) were melted under vacuum and were cast under vacuum into an alloy ingot of 30 mm diameter. The alloy ingot was subjected to cold forging and was drawn into a wire core of 10 mm diameter having a Curie point of around 150° C. Then, the surface of the wire core was subjected to polishing. Then, 0.3 to 2.0 mm thick aluminum sheathings in the form of a tube were fitted respectively on a plurality of wire cores to form intermediate products. Then, the intermediate products were drawn into wires having diameters of 2.4 to 3.0 mm, respectively, so that each of the wire core was reduced into a diameter of 2.3 mm. The ratio of the aluminum sheathing to the wire in cross-section was 10 to 49%.

Comparative wires 1 and 2 were prepared according to the above procedure except that the aluminum sheathing was not applied to those wires, each of the wire having a diameter of 2.3 mm. The comparative wire 2 was galvanized at a final stage of the manufacture.

Figure 1:
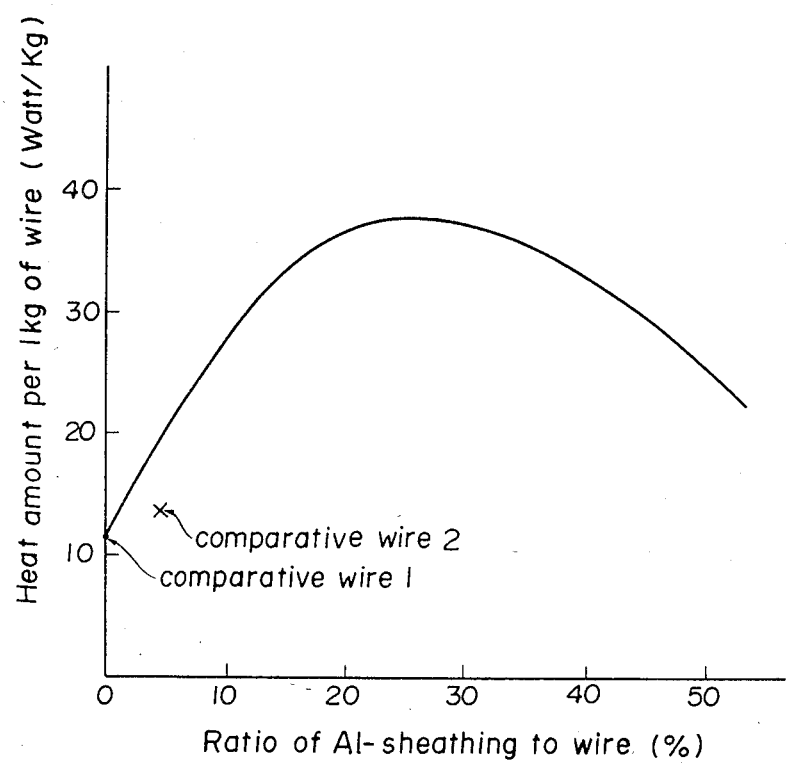
FIG. 1 is a graph showing the relation between the amount of heat per 1 kg of an aluminum-sheathed wire and the ratio of the aluminum sheathing to the wire.

Then, the wires of this invention and the comparative wires 1 and 2 were placed in an alternating magnetic field of 30 Oe (50 Hz), and the amount of heat generated by those wires was measured. The results obtained are shown in a graph of FIG.1.

Because of the limitation of the weight of the wire mounted on the conductor of the transmission line, the heat required for the melting of snow or ice on the conductor is at least 30 Watt per 1 kg of the wire in the magnetic field of 30 Oe. As can be seen from the graph of FIG.1, when the ratio of the aluminum sheathing to the wire in cross-section is 15 to 40%, the amount of heat generated is sufficient to achieve a satisfactory melting effect.

EXAMPLE 2

There was prepared a wire core made of an alloy composed of 36% by weight of nickel, 3.1% by weight of chromium, 1% by weight of silicon and balance iron, the wire core having a Curie point of around 130° C.

Another wire core was prepared from hard steel (JIS G 3506 SWRH 62 A).

Then, the alloy and steel cores were covered respectively with sheathings made of aluminum for an electrical application to produce wire 1 of this invention and comparative wire 2a. In each case, the ratio of the aluminum sheathing to the wire in cross-section was 25%.

Comparative wire 3 was prepared from the above-mentioned alloy and had no sheathing. Also, comparative wire 4 was prepared from the above-mentioned hard steel and had no sheathing.

Then, the wire 1 of this invention and the comparative wires 2a, 3 and 4 were placed in an alternating magnetic field of 50 Oe and 15 Oe (50 Hz), and the amount of heat generated by those wires at a temperature of 0° C. was measured. The results obtained are shown in Table 1 in which the amount of heat is indicated in terms of Watt per 1 kg of each wire.

As can be seen from Table 1, the comparative wire 2a and the comparative wire 4 generated excessive heat. Thus, in the case where the wire is made of hard steel regardless of whether it has a conductive metal sheathing, undue loss is produced.

The amount of heat generated by the wire 1 of this invention was about four times as much as the amount of heat generated by the comparative wire 3. Thus, in the case where the magnetic material element is made of an alloy containing iron and nickel, a conductive metal sheathing need to be provided.

TABLE 1

| | Ratio of Al sheathing to core | Watt/kg (50 Oe) | Heat ratio of sheathed wire to non-sheathed wire (50 Oe) | Watt/kg (15 Oe) | Heat ratio of sheathed wire to non-sheathed wire (15 Oe) |
| --- | --- | --- | --- | --- | --- |
| Wire 1 of this invention | 25% | 48 | 4.4 | 20 | 3.2 |

TABLE 1-continued

|  | Ratio of Al sheathing to core | Watt/kg (50 Oe) | Heat ratio of sheathed wire to non-sheathed wire (50 Oe) | Watt/kg (15 Oe) | Heat ratio of sheathed wire to non-sheathed wire (15 Oe) |
| --- | --- | --- | --- | --- | --- |
| Comparative wire 3 | 0% | 11 |  | 6.2 |  |
| Comparative wire 2a | 25% | 105 | 1.3 | 9.8 | 0.93 |
| Comparative wire 4 | 0% | 82 |  | 10.5 |  |

EXAMPLE 3

Wire cores of an alloy composed of 54% by weight of nickel, 9% by weight of chromium, 0.5% by weight of silicon and balance iron were prepared according to the procedure in Example 1. Then, copper sheathings were applied to five wire cores so prepared so that intermediate products were produced. Then, those five intermediate products were drawn to a diameter of 2 mm to produce wires 3 to 7 of this invention. The wires were processed to reduce the residual strain thereof. The ratios of the copper sheathing to the wire in cross-section in respect of the wires 3 to 7 of this invention were 15%, 25%, 33%, 40% and 47%.

Comparative wire 5 was prepared according to the above procedure in this Example except that the copper sheathing was not applied to the wire. The comparative wire 5 had a diameter of 2 mm and was processed to reduce the strain thereof.

Then, the wires 3 to 7 of this invention and the comparative wire 5 were placed in an alternating magnetic field of 30 Oe (50 Hz) with the axes of those wires disposed in the direction of the magnetic field, and the amount of heat generated by those wires was measured. The results obtained are shown in a graph of FIG. 2.

Figure 2:
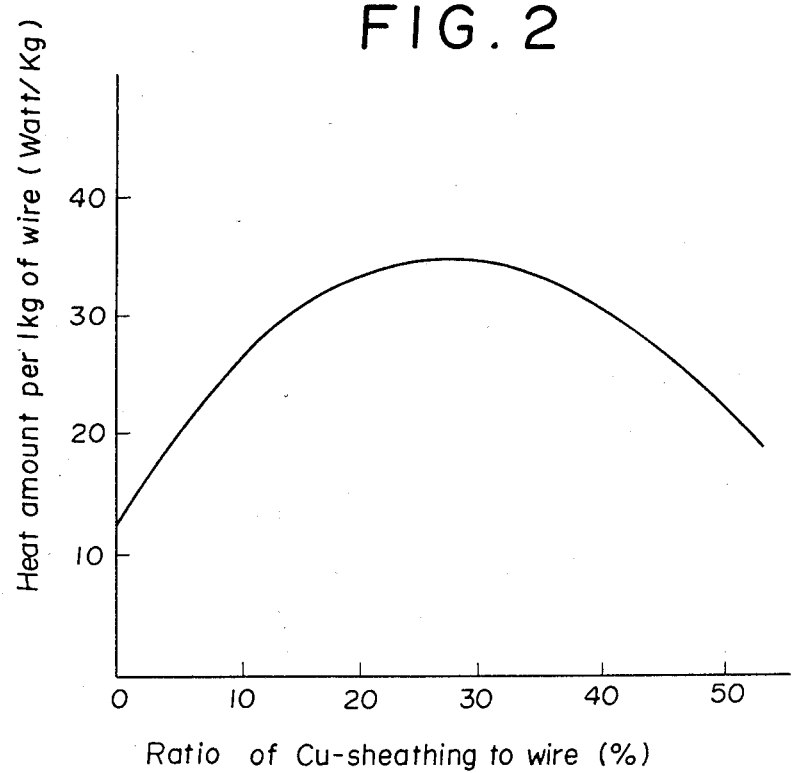
FIG. 2 is a graph showing the relation between the amount of heat per 1 kg of a copper-sheathed wire and the ratio of the copper sheathing to the wore.

As can be seen from the graph of FIG. 2, in order to obtain a heat amount of at least 30 Watt per 1 kg of the wire, the ratio of the copper sheathing to the wire in cross-section need to be 15 to 40%.

EXAMPLE 4

1200 g of electrolytic iron of 99.9 weight % purity, 720 g of nickel of 99.97 weight % purity, 60 g of chromium of 99.3 weight % purity and 20 g of metallic silicon of 98 weight % purity were melted in a high-frequency vacuum furnace to produce a molten material. Then, the molten material was cast into an ingot having a diameter of 30 mm and a length of 300 mm. Then, the ingot was subjected to hot forging at temperature of 1100° C. to form a wire core of 15 mm diameter. Then, the wire core was polished to remove oxide scales therefrom and subsequently reduced to a diameter of 6 mm by cold drawing. Then, the wire core was fitted in an aluminum sheathing in the form of a tube to produce an intermediate product. Then, the intermediate product was processed or reduced to a diameter of 2.6 mm to produce a wire 8 of this invention in a manner not to affect the magnetic properties thereof.

EXAMPLE 5

432 g of electrolytic iron of 99.9 weight % purity, 259.2 g of nickel of 99.97 weight % purity, 21.6 g of chromium of 99.3 weight % purity and 7.2 of metallic silicon of 98 weight % purity were melted in a high-frequency vacuum furnace to produce a molten material. Then, the molten material was cast into an ingot having a diameter of 20 mm and a length of 300 mm. Then, the ingot was cold forged to a wire core of 10 mm diameter. Then, the wire core was fitted in an aluminum sheathing in the form of a tube to produce an intermediate product. Then, the intermediate product was drawn to a diameter of 2.6 mm in the same manner described in Example 4, thereby producing a wire 9 of this invention.

EXAMPLE 6

385.2 g of electrolytic iron, 266.4 g of nickel, 64.8 g of chromium and 3.6 g of silicon were melted in a high-frequency vacuum furnace to form an ingot. According to the procedure in Example 5, there was prepared a wire 10 of this invention having a diameter of 2.6 mm and provided with an aluminum sheathing. The wire core of this wire has a low Curie point of about 90° C., and has a saturated magnetic flux density of 4800 G and a hysteresis loss of 560 J/m$^3$ at a temperature of 0° C. The amount of the heat generated by the wire 10 of this invention in an alternating magnetic field of 15 Oe (50 Hz) is 10 Watt per 1 kg of the wire, and the amount of heat generated in the alternating magnetic field of 30 Oe is 16 Watt per 1 kg of the wire.

EXAMPLE 7

A wire core of 10 mm diameter was prepared according to the procedure in Example 5. Then, the wire core was fitted in a copper sheathing in the form of a tube to produce an intermediate product. Then, the intermediate product was drawn to a diameter of 2 mm to produce a wire 11 of this invention in a manner not to affect the magnetic properties thereof. The wire core had the same composition as the wire cores in Examples 4 and 5 and hence exhibited the same magnetic properties. In the case where an aluminum-sheathed wire and a copper-sheathed wire have magnetic material cores of the same composition, the amount of heat generated by the aluminum-sheathed wire is substantially the same as the amount of heat generated by the copper-sheathed wire, but since copper is heavier than aluminum, the copper-sheathed wire is less than the aluminum-sheathed wire in the amount of generation of heat per unit mass.

Also, for comparison purposes, comparative wires 6 and 7 were prepared. A hard steel wire (JIS G 3506-SWRH 57 B; analytical value by weight %: C—0.58, Si—0.25, Mn—0.80, P—0.02, S—0.01) having a diameter of 9.5 mm was used as a wire core for the comparative wire 6. An aluminum sheathing was fitted on the hard steel wire to form an intermediate product. Then, the intermediate product was drawn to a diameter of 2.6 mm to provide the comparative wire 6. The ratio of the aluminum sheathing to the wire in cross-section was 25%.

A soft steel wire (JIS G 3503-SWRY 11; analytical value by weight %: C—0.08, Si—0.02, Mn—0.50, P—0.01, Cu—0.05) having a diameter of 9.5 mm was used as a wire core for the comparative wire 7. An aluminum sheathing was fitted on the soft steel wire to form an intermediate product. Then, the intermediate product was drawn to a diameter of 2.6 mm to provide the comparative wire 7. The ratio of the aluminum sheathing to the wire in cross-section was 25%.

Figure 3:
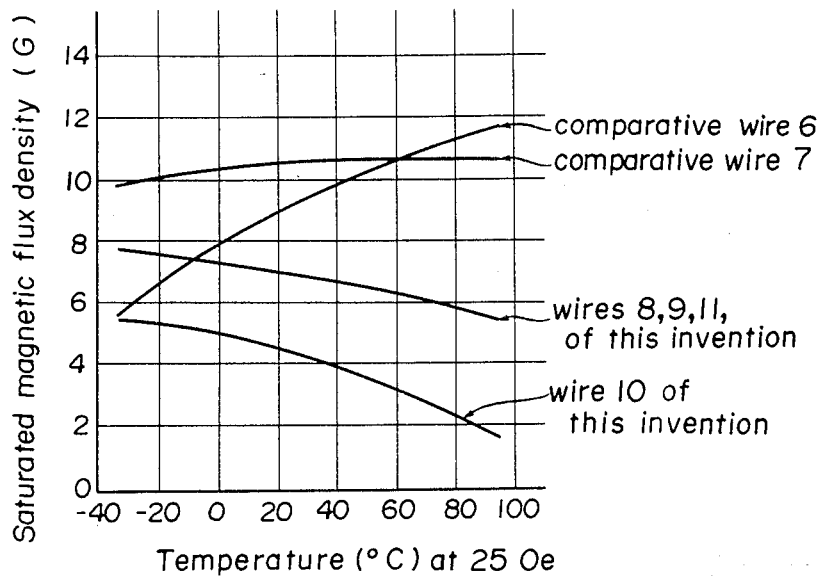
FIG. 3 is a graph showing the relation between a saturated magnetic flux density and a temperature.

The wires 8 to 11 of this invention prepared respectively in Examples 4 to 7 and the comparative wires 6 and 7 were placed in an alternating magnetic field of 25 Oe (50 Hz), and the relation between the saturated magnetic flux density (G) and the temperature (°C.) was observed. The results obtained are shown in a graph of FIG. 3. As can be seen from this graph, in respect of the wires 8 to 11 of this invention, the saturated magnetic flux density becomes smaller with the increase of the temperature. On the other hand, in respect of the comparative wires 6 and 7, the saturated magnetic flux density becomes greater with the increase of the temperature. Thus, the wires of this invention have superior properties.

Figure 4:
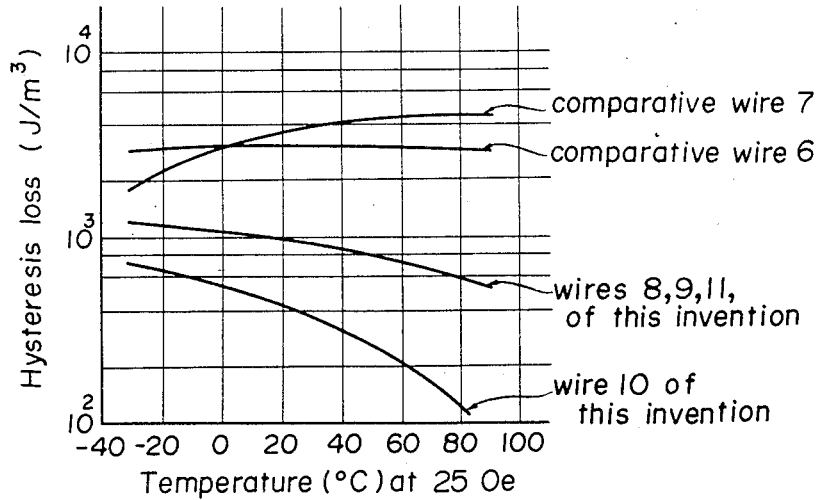
FIG. 4 is a graph showing the relation between a hysteresis loss and a temperature.

Also, the relation between the temperature (°C.) and the hysteresis loss (J/m$^3$) in respect of the wires 8 to 11 of this invention and the comparative wires 6 and 7 placed in the magnetic field of 25 Oe was observed. The results obtained are shown in a graph of FIG. 4. As can be seen from this graph, in respect of the wires 8 to 11 of this invention, the hysteresis loss becomes smaller with the increase of the temperature. On the other hand, in respect of the comparative wires 6 and 7, the hysteresis loss does not become smaller with the increase of the temperature.

Figure 5:
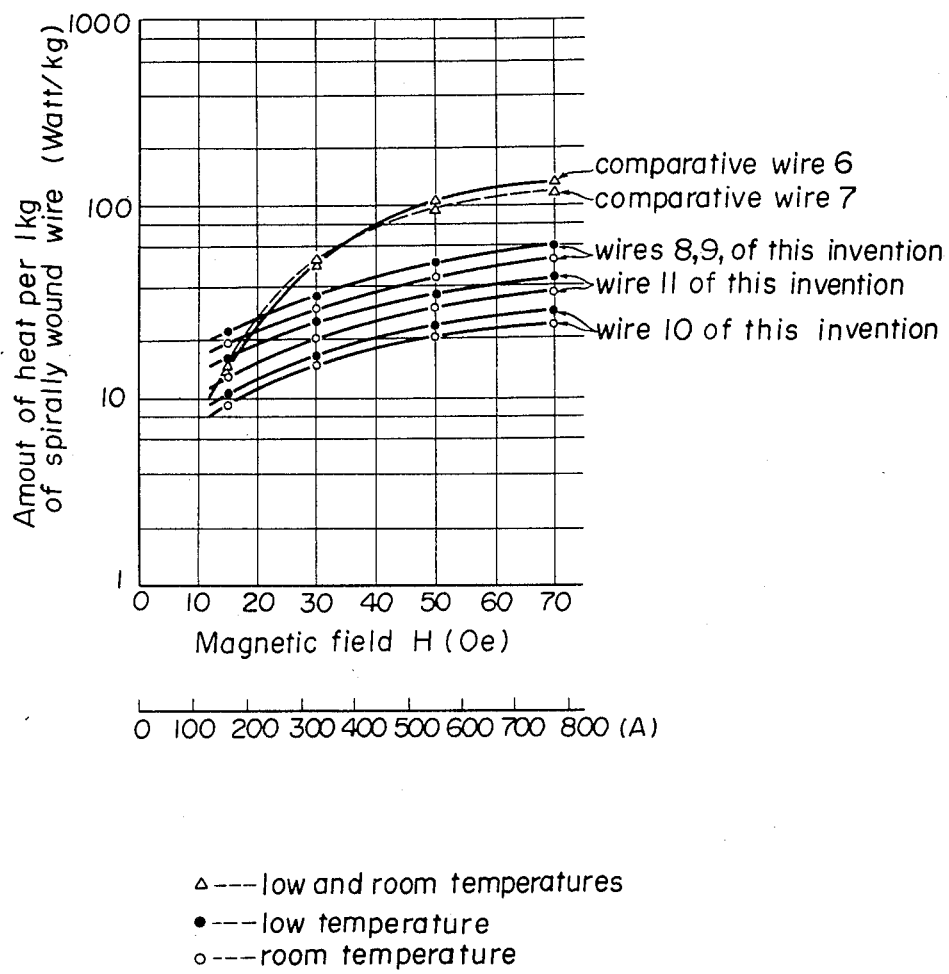
FIG. 5 is a graph showing the relation between the amount of heat per 1 kg of wire spirally wound on an ACSR and the magnetic field.

Also, the amount of heat, generated by each of the wires 8 to 11 and comparative wires 6 and 7 wound at a pitch of 50 mm around a conductor (ACSR) through which current (50 Hz) flows to produce an alternating magnetic field in each wire, was observed. The conductor had a conductive cross-sectional area of 810 mm$^2$. The results obtained are shown in a graph of FIG. 5. As can be seen from this graph, when the magnetic field H is less than 20 Oe, the amount of heat generated by the wires 8 and 9 of this invention is greater than the amount of heat generated by the comparative wires 6 and 7, and in addition the wires of this invention have a smaller degree of increase of heat generation than the comparative wires.

Next, there was prepared a wire of 2.6 mm diameter consisting of an aluminum sheathing and a wire core composed of 36% nickel, 3% chromium, 1% silicon and balance iron (% by weight). This aluminum sheathed wire was wound spirally around a conductor (ACSR) having a conductive cross-sectional area of 810 mm$^2$ and a diameter of 38.4 mm at a pitch of 50 mm. Then, snow was caused to deposit on the ACRS with the spirally wound wire to carry out a snow-melting test under the conditions shown in Table 2. The results are also shown in Table 2.

TABLE 2

|  | No wire wound around conductor | Test 1 | Test 2 | Test 3 | Test 4 |
|---|---|---|---|---|---|
| Current (A) | 300 | 300 | 300 | 200 | 200 |
| Wind velocity (m/s) | 5 | 5.5 | 5.5 | 5.5 | 5.5 |
| Snowfall (cm/H) | 6.0 | 8.0 | 6.0 | 4.9 | 2.0 |
| Temperature (°C.) | −2.0 Ice-like snow | −2.0 Sherbet-like snow | −2.0 Snow melted completely | −2 to −2.5 Sherbet-like snow | −2 to −2.5 Sherbet-like snow |

As is clear from Table 2, when current of not less than 300 A flows through the conductor, the snow deposited on the conductor with the aluminum-sheath wire is completely melted. When the current is 200 A, the deposited snow is not completely melted, but melted in a sherbet-like manner, i.e., partly melted, so that the snow slides off the conductor to achieve a substantial melting effect.

The magnetic material core of the wire of this invention contains, apart from impurities, 32 to 52% by weight of nickel (Ni), 0.5 to 9% by weight of chromium (Cr), 0.2 to 2% by weight of silicon (Si) and balance iron. When the nickel content is 32 to 52% by weight, the Curie point of the magnetic material core is lowered without deteriorating the magnetic properties, i.e., a saturated magnetic flux density and a hysteresis loss. When the nickel content does not fall within this range, a satisfactory effect can not be achieved. In addition, when the nickel content exceeds the upper limit of 52%, processability such as a drawing ability is lowered.

The addition of 0.5 to 9% chromium serves to improve the magnetic properties to a satisfactory level and also to lower the Curie point. When the chromium content exceeds 9%, the magnetic properties are deteriorated.

The addition of silicon achieves similar effects as the addition of chromium, and its content should be not more than 2%. When its content exceeds 2%, processability is adversely affected.

Figure 6:
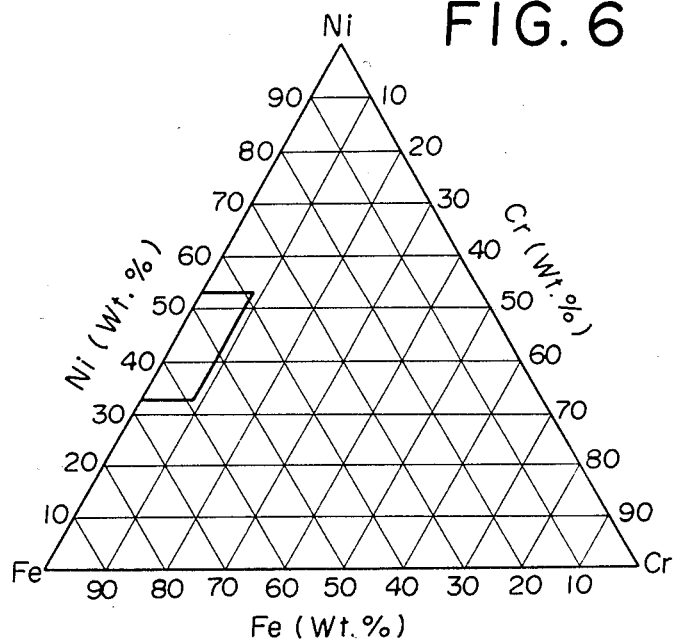
FIG. 6 is a triangular diagram showing the composition of alloys containing Fe, Ni, Cr and Si.
Figure 7:
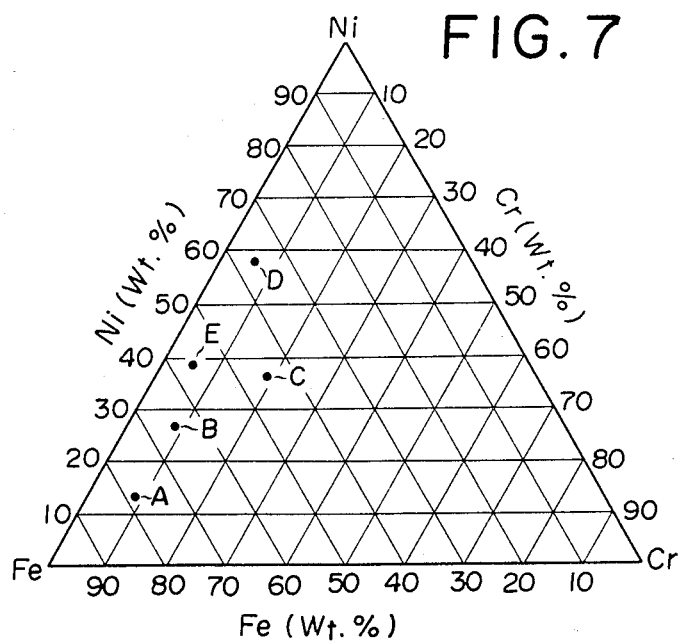
FIG. 7 is a diagram similar to FIG. 6 but showing some examples of alloy compositions.

The above-mentioned composition range of the magnetic material core is indicated by a block in a triangular diagram of FIG. 6, the silicon content being 1%. Several examples of magnetic material cores are qualitatively indicated by A, B, C, D and E in a triangular diagram of FIG. 7. Although the sample A has increased saturated magnetic flux density and hysteresis loss, its Curie point is extremely high. The samples B and C are non-magnetic at a temperature of around 0° C. Although the sample D has increased saturated magnetic flux density and hysteresis loss, its processability is lowered. The sample E which falls within the range of this invention has increased saturated magnetic flux density and hysteresis loss at a temperature of around 0° C.

EXAMPLE 8

Wire cores a, b, c and d having respective compositions shown in Table 3 were prepared by casting ingots of 30 mm diameter by the use of a vacuum furnace and then by reducing the ingots to a diameter of 10 mm by hot forging and cold forging. Then, the wire cores were cleaned by removing scales of oxides and oil from their surfaces. Then, aluminum sheathings in the form of a tube having an outer diameter of 12 mm and a thickness of 0.8 mm were fitted on the wire cores a, b, c, and d to produce intermediate products. Then, the intermediate products were drawn to a diameter of 2.6 mm to produce wires a', b', c' and d' having the wire core a, b, c, and d, respectively, the aluminum sheathing and wire core of each wire being metallically bonded together. The sulfur and phosphorus contents of each wire core are impurities.

The wires a', b', c' and d' were bent to apply a reverse strain to the entire outer peripheral portion of the wire core to reduce the residual strain inherent in the wire core. The ratio of the radius r of the wire core to a radius R of curvature of the bent wire was 1.5%, 5.2% and 9.5%. The wires a', b', c' and d', subjected to this bending operation and the wires a', b', c', and d' not subjected to such bending were observed in respect of the magnetic properties, using a DC magnetization measuring device. The results obtained are shown in Table 4. As seen from Table 4, the wires subjected to the bending operation exhibited much improved magnetic properties.

TABLE 3

| | Ni | Cr | Si | S | P | (Wt. %) Fe |
|---|---|---|---|---|---|---|
| a | 36.2 | 3.1 | 1.0 | 0.005 | 0.003 | Balance |
| b | 37.3 | 8.9 | 0.5 | 0.004 | 0.003 | " |
| c | 36.5 | 9.0 | 1.0 | 0.005 | 0.004 | " |
| d | 45.7 | 5.1 | 1.1 | 0.006 | 0.004 | " |

TABLE 4

| | No bending operation | | T/R: 5.2% | | r/R: 1.5% | | r/R: 9.5% | |
|---|---|---|---|---|---|---|---|---|
| | Bs (Gauss) | Wh (J/m$^3$) | Bs (Gauss) | (J/m$^3$) | Bs (Gauss) | Wh (J/m$^3$) | BS (Gauss) | Wh (J/m$^3$) |
| a' | 6,480 | 1,055 | 9,260 | 1,210 | 6,520 | 1,070 | mechanically damaged | |
| b' | 5,780 | 719 | 7,480 | 738 | 5,840 | 725 | | |
| c' | 5,210 | 512 | 7,250 | 681 | 5,280 | 530 | | |
| d' | 8,720 | 1,384 | 12,300 | 1,648 | 8,850 | 1,420 | | |

(Temperature: 0° C; Magnetic field: 30 Oe)

EXAMPLE 9

According to the procedure in Example 8, there was prepared an aluminum-sheathed wire of 2.6 mm diameter having a wire core containing apart from impurities 62% by weight of nickel, 3.1% by weight of chromium, 1% by weight of silicon and balance iron. Seven samples 1 to 7 were prepared from the wire so formed and bent under the conditions shown in Table 5 so that a bending strain (r/R) was applied to the outer peripheral portion of the wire. The magnetic properties of those samples were observed according to the procedure in Example 8.

Samples 3 to 6 having a bending strain in the range of 2 to 9% exhibited much improved magnetic properties. Sample 2 having a bending strain of less than 2% was not significantly improved in the magnetic properties. When the bending strain exceeds 9%, the wire is subjected to a mechanical damage such as meandering and rupture.

TABLE 5

| Sample No. | Bending strain (%) (r/R) | Bs (Gauss) | Wh (J/m$^3$) |
|---|---|---|---|
| 1 | 0 | 6,480 | 1,055 |
| 2 | 1.5 | 6,520 | 1,070 |
| 3 | 2.3 | 8,970 | 1,120 |
| 4 | 5.2 | 9,260 | 1,210 |

TABLE 5-continued

| Sample No. | Bending strain (%) (r/R) | Bs (Gauss) | Wh (J/m$^3$) |
|---|---|---|---|
| 5 | 6.7 | 9,360 | 1,220 |
| 6 | 8.3 | 9,540 | 1,240 |
| 7 | 9.5 | mechanically damaged | |

EXAMPLE 10

Three kinds of aluminum-sheathed wires a'', b'' and e of 2.6 mm diameter were prepared using the wire cores a and b in Table 3 and a wire core of carbon steel, respectively. Samples were prepared from those wires and subjected to a bending operation under the conditions shown in Table 6. The amount of heat generated by each sample in an alternating magnetic field of 15 Oe (50 Hz) at a temperature of 0° C. was measured. The results obtained are shown in Table 6. The heat amount is indicated in terms of Watt per 1 kg of each sample.

For comparison purposes, the heat amount of the samples not subjected to the bending operation was also measured.

As seen from Table 6, the samples a'' and b'', having the respective cores a and b and subjected to the bending operation to reduce the residual strain, generated a much larger amount of heat than those not subjected to the bending operation. On the other hand, the sample e having the wire core of carbon steel was not improved in the generation of heat even though it was subjected to the bending operation. Thus, only in the case of the magnetic material wire having a core of an iron-nickel based alloy, the reduction of the strain is efficient in improvement of the magnetic properties and heat generation.

As described above, when the bending strain (r/R) is less than 2%, a desired heat amount is not achieved. Also, if the bending strain is more than 9%, the wire is mechanically damaged.

Therefore, the bending strain, i.e., the ratio of the radius r of the wire core to the radius R of curvature of the bent wire should be 2 to 9% in order to achieve the desired heat amount for melting the snow without sacrifice of the mechanical strength of the magnetic material wire.

TABLE 6

| Sample | | Bending strain (r/R) | Watt/kg |
|---|---|---|---|
| a'' | (strain reduced) | 5.2% | 22.3 |
| b'' | (strain reduced) | 5.2% | 17.6 |
| e | (strain reduced) | 5.2% | 9.6 |
| a'' | (no strain removed) | — | 10.2 |
| b'' | (no strain removed) | — | 8.3 |
| e | (no strain removed) | — | 9.5 |
| a'' | (strain reduced) | 1.5% | 12.2 |
| b'' | (strain reduced) | 1.5% | 10.4 |

What is claimed is:

1. A method of producing a magnetic material wire adapted to be wound around an electric conductor for generating heat which comprises the steps of:
   (a) preparing an elongated core of a magnetic material having a Curie point of 70° to 250° C., said core containing apart from impurities 32 to 52% by weight of nickel, not less than 0.5 but less than 9% by weight of chromium, 0.2 to 2% by weight of silicon and balance iron;
   (b) covering said core with a high conductive metal sheathing of a uniform thickness to form an intermediate product;
   (c) reducing said intermediate product to a predetermined cross-section to form the wire, the ratio of the metal sheathing to the wire in cross-sectional area being in the range of 15 to 40%; and
   (d) bending the wire to apply a reverse strain to the entire peripheral portion of said core in such a manner that the ratio of the radius of the core to the radius of the curvature of the bent wire is in the range of 2 to 9%, thereby reducing the residual strain of the wire so that the magnetic property of said core contributable to the heat generation of the wire is improved.

2. The method of producing a magnetic material wire according to claim 1, wherein said magnetic metal sheathing is made of a material selected from the group consisting of copper, aluminum, zinc and their alloy.